(12) United States Patent
Wu et al.

(10) Patent No.: US 11,966,852 B2
(45) Date of Patent: Apr. 23, 2024

(54) SYSTEMS AND METHODS FOR SITUATION AWARENESS

(71) Applicant: SHANGHAI UNITED IMAGING INTELLIGENCE CO., LTD., Shanghai (CN)

(72) Inventors: Ziyan Wu, Cambridge, MA (US); Srikrishna Karanam, Cambridge, MA (US); Lidan Wang, Cambridge, MA (US)

(73) Assignee: SHANGHAI UNITED IMAGING INTELLIGENCE CO., LTD., Shanghai (CN)

( * ) Notice: Subject to any disclaimer, the term of this patent is extended or adjusted under 35 U.S.C. 154(b) by 1168 days.

(21) Appl. No.: 16/710,070

(22) Filed: Dec. 11, 2019

(65) Prior Publication Data

US 2021/0182694 A1 Jun. 17, 2021

(51) Int. Cl.
*G06N 5/02* (2023.01)
*G06F 9/38* (2018.01)
(Continued)

(52) U.S. Cl.
CPC ............ *G06N 5/02* (2013.01); *G06F 9/3836* (2013.01); *G06F 17/18* (2013.01); *G06N 3/04* (2013.01); *G06N 3/08* (2013.01)

(58) Field of Classification Search
CPC .......... G06F 17/18; G06N 3/04; G06N 3/045; G06N 3/08; G06N 5/02
See application file for complete search history.

(56) References Cited

U.S. PATENT DOCUMENTS

2016/0063858 A1 3/2016 Schmüdderich et al.
2017/0120804 A1 5/2017 Kentley et al.
(Continued)

FOREIGN PATENT DOCUMENTS

CN 202838579 U 3/2013
CN 104407616 A 3/2015
(Continued)

OTHER PUBLICATIONS van der Heiden, Tessa, et al. "SafeCritic: Collision-aware trajectory prediction." arXiv preprint arXiv: 1910.06673 (Oct. 2019). (Year: 2019).*

(Continued)

*Primary Examiner* — Benjamin P Geib
(74) *Attorney, Agent, or Firm* — METIS IP LLC

(57) ABSTRACT

The present disclosure generally provides systems and methods for situation awareness. When executing a set of instructions stored in at least one non-transitory storage medium, at least one processor may be configured to cause the system to perform operations including obtaining, from at least one of one or more sensors, environmental data associated with an environment corresponding to a first time point, generating a first static global representation of an environment corresponding to the first time point based at least in part on the environmental data, generating a first dynamic global representation of the environment corresponding to the first time point based at least in part on the environmental data, and estimating, based on the first static global representation and the first dynamic global representation, a target state of the environment at a target time point using a target estimation model.

20 Claims, 9 Drawing Sheets

(51) Int. Cl.
  *G06F 17/18*  (2006.01)
  *G06N 3/04*  (2023.01)
  *G06N 3/08*  (2023.01)

(56) References Cited

U.S. PATENT DOCUMENTS

| | | |
|---|---|---|
| 2019/0155290 A1 | 5/2019 | Luo |
| 2019/0234751 A1 | 8/2019 | Takhirov |
| 2020/0143093 A1 | 5/2020 | Zhao et al. |
| 2021/0129868 A1 | 5/2021 | Nehmadi |

FOREIGN PATENT DOCUMENTS

| | | |
|---|---|---|
| CN | 107908819 A | 4/2018 |
| CN | 109073389 A | 12/2018 |
| CN | 109389824 A | 2/2019 |
| CN | 110083163 A | 8/2019 |
| CN | 110103952 A | 8/2019 |

OTHER PUBLICATIONS

Lee, Namhoon, et al. "DESIRE: Distant Future Prediction in Dynamic Scenes with Interacting Agents." arXiv preprint arXiv: 1704.04394 (2017). (Year: 2017).*

Xie, Yuanyuan et al., Path Planning for Robots Based on Ant Colony Algorithm under Dynamic Environment, Journal of Nanjing Normal University(Engineering and Technology), 6(3): 45-50, 2006.

S. Mahmoud Zadeh et al., Online Path Planning for AUV Rendezvous in Dynamic Cluttered Undersea Environment Using Evolutionary Algorithms, Applied Soft Computing, 2017, 31 pages.

Fan, Jieru et al., Overview of MAV/UAV Collaborative Combat and Its Key Technologies, Unmanned Systems Technology, 1: 39-47, 2019.

\* cited by examiner

SYSTEMS AND METHODS FOR SITUATION AWARENESS

TECHNICAL FIELD

The present disclosure generally relates to situation awareness, and in particular, to systems and methods for estimating a target state of an environment at a target time point.

BACKGROUND

Situation awareness usually refers to the perception of environmental elements and events with respect to time and/or space, the comprehension of their meaning, and the projection of their future status. In recent years, systems and methods for situation awareness have been applied in various fields, such as traffic control, healthcare, emergency response, factory management, etc. Some existing methods use real-time detection algorithms and tracking-based methods to estimate the likelihood of an abnormal situation, such as a collision between two or more elements in the environment. Synchronized inputs from multiple sensors or a single input from a single sensor is often used in existing methods. Besides, prior knowledge about the set-up and placements of sensor(s) is often needed. These techniques can cause some methods to become difficult to be applied in different environments. Therefore, it is desirable to provide more adaptive systems and methods for situation awareness.

SUMMARY

According to an aspect of the present disclosure, a system for situation awareness is provided. The system may include at least one non-transitory storage medium including a set of instructions and at least one processor in communication with the at least one non-transitory storage medium. When executing the set of instructions, the at least one processor is configured to cause the system to perform operations including obtaining, from at least one of one or more sensors, environmental data associated with an environment corresponding to a first time point and generating a first static global representation of an environment corresponding to the first time point based at least in part on the environmental data. The first static global representation may indicate a first state of one or more static elements in the environment. The operations may further include generating a first dynamic global representation of the environment corresponding to the first time point based at least in part on the environmental data, the first dynamic global representation indicating a first state of one or more moving elements in the environment. The operations may further include estimating, based on the first static global representation and the first dynamic global representation, a target state of the environment at a target time point using a target estimation model.

In some embodiments, the generating a first static global representation of an environment corresponding to the first time point based at least in part on the environmental data may include obtaining a second static global representation of a second state of the environment corresponding to a second time point, generating a first reference global representation of the first state of the environment corresponding to the first time point, and generating the first static global representation by aggregating the first reference global representation with the second static global representation using a static-update model. The first reference global representation may include dynamic information associated with the environment at the first time point and static information associated with the environment at the first time point.

In some embodiments, the environmental data may correspond to a portion of the environment, and the generating a first reference global representation may include obtaining a second reference global representation corresponding to a reference time point and updating a section of the second reference global representation that corresponds to the portion of the environment. The reference time point may be between the first time point and the second time point;

In some embodiments, the updating a section of the second reference global representation that corresponds to the portion of the environment may include performing a feature extraction operation on the environmental data to generate one or more feature vectors and un-projecting the one or more feature vectors to update the section of the second static global representation that corresponds to the portion of the environment.

In some embodiments, the generating the first static global representation may include obtaining a second dynamic global representation of a second state of the environment at a second time point; generating, based at least in part on the environmental data, update information associated with the environment; generating, based on the second dynamic global representation, an estimated dynamic global representation of an estimated state of the environment at the first time point; and generating, based on the update information and the estimated dynamic global representation, the first dynamic global representation of a first state of the environment corresponding to the first time point, wherein the first dynamic global representation indicates a first state of one or more moving elements in the environment.

In some embodiments, the generating an estimated dynamic global representation of an estimated state of the environment at the first time point may include determining a time difference between the second time point and the first time point and generating, using a dynamic-estimation model, the estimated dynamic global representation based on the time difference.

In some embodiments, the target time point may be later than the first time point, and the target state of the environment may include whether an abnormal situation in the environment is likely to occur.

In some embodiments, the target estimation model may be a trained neural network model.

In some embodiments, the estimating, based on the first static global representation and the first dynamic global representation, a target state of the environment at a target time point using a target estimation model may include generating a joint global representation of the first state of the environment corresponding to the first time point by fusing the first static global representation and the first dynamic global representation; determining, based on the joint global representation, a target probability using the target estimation model; comparing the target probability with a probability threshold; and in response to a determination that the target probability exceeds the probability threshold, estimating that an abnormal situation is likely to occur in the environment at the target time point. The target probability may be a probability that an abnormal situation is likely to occur in the environment at the target time point.

In some embodiments, the abnormal situation may include a collision between at least two elements in the environment.

In some embodiments, in response to a determination that an abnormal situation is likely to occur in the environment, the at least one processor is configured to cause the system to perform additional operations including: causing an alert related to the abnormal situation to be generated.

In some embodiments, the target state of the environment may include a target state of an undetected portion of the environment that is undetectable by the one or more sensors.

In some embodiments, the target state of the undetected portion of the environment may be estimated based on one or more hidden layers of the target estimation model. At least a portion of training data for training the target estimation model may relate to one or more sample environments that are similar to the environment.

In some embodiments, the one or more sensors include a plurality of sensors at least two of which are configured to acquire data associated with the environment or a portion thereof at different time intervals.

In some embodiments, the one or more sensors include a plurality of sensors at least two of which are configured to acquire data associated with different portions of the environment.

According to another aspect of the present disclosure, a system is provided. The system may include at least one non-transitory storage medium including a set of instructions and at least one processor in communication with the at least one non-transitory storage medium. When executing the set of instructions, the at least one processor may be configured to cause the system to perform operations including obtaining environmental data acquired by at least one of one or more sensors and obtaining a second dynamic global representation of a second state of the environment corresponding to a second time point. The second time point may be different from the first time point. The environmental data may be associated with the environment corresponding to a first time point. The operations may further include generating update information associated with the environment based at least in part on the environmental data. The update information may indicate a difference between a status of one or more moving elements in the environment at the first time point and a status of one or more moving elements in the environment at the second time. The operations may further include generating, based on the second dynamic global representation, an estimated dynamic global representation of an estimated state of the environment at the first time point, and generating, based on the update information and the estimated dynamic global representation, a first dynamic global representation of a first state of the environment at the first time point. The first dynamic global representation indicates a status of each of the one or more moving elements in the environment at the first time point.

In some embodiments, the one or more sensors may include a sensor configured to acquire data of a portion of the environment at a time point.

In some embodiments, the one or more sensors may include a plurality of sensors at least two of which are configured to acquire data associated with the environment or a portion thereof at different time intervals.

In some embodiments, the one or more sensors may include a plurality of sensors at least two of which are configured to acquire data associated with different portions of the environment.

In some embodiments, the generating update information associated with the environment based at least in part on the environmental data may include determining whether an update condition is satisfied, and in response to a determination that the update condition is satisfied, generating the update information.

In some embodiments, the update condition may include at least one of: one or more sets of data associated with the environment have been received from a preset count of sensors since the second time point; or one or more sets of data associated with the environment corresponding to a preset count of first reference time points have been received since the second time point, wherein each of the first reference time points is between the second time point and the first time point.

In some embodiments, the generating update information associated with the environment based at least in part on the environmental data may include obtaining a second reference global representation associated with the environment corresponding to a second reference time point, generating a first reference global representation associated with the environment corresponding to the first time point, and generating the update information by comparing the second reference global representation and the first reference global representation. The second reference time point may be between the first time point and the second time point, and the second reference global representation may include dynamic information associated with the environment at the second reference time point and static information associated with the environment at the second reference time point. The first reference global representation may include dynamic information associated with the environment at the first time point and static information associated with the environment at the first time point.

In some embodiments, the environmental data may correspond to a portion of the environment, and the generating a first reference global representation associated with the environment corresponding to the first time point may include updating a section of the second reference global representation that corresponds to the portion of the environment.

In some embodiments, the at least one processor may be configured to cause the system to perform additional operations including performing a feature extraction operation on the environmental data to generate one or more feature vectors, and un-projecting the one or more feature vectors to determine the section of the second static global representation that corresponds to the portion of the environment.

In some embodiments, the generating, based on the second dynamic global representation, an estimated dynamic global representation of an estimated state of the environment at the first time point may include determining a time difference between the second time point and the first time point, and generating, using a dynamic-estimation model, the estimated dynamic global representation based on the time difference.

In some embodiments, the generating a first dynamic global representation of the first state of the environment may include generating the first dynamic global representation by aggregating the update information and the estimated dynamic global representation using a dynamic-update model.

In some embodiments, the second time point may be earlier than the first time point.

In some embodiments, the environmental data may include image data.

In some embodiments, the one or more sensors may include at least one of a dome camera, a monocular camera, a binocular camera, a multi-view camera, a depth camera, a black-white camera, a color camera, an infrared camera, or a radar.

In some embodiments, the at least one processor may be configured to cause the system to perform additional operations including estimating, based on the first dynamic global representation, a target dynamic state of the environment at a target time point using a target dynamic estimation model. The target dynamic state may indicate a status of each of one or more moving elements in the environment at the target time point.

In some embodiments, the target dynamic state may include whether a collision is likely to occur between at least two of the one or more moving elements at the target time point.

According to yet another aspect of the present disclosure, a non-transitory computer readable medium is provided. The non-transitory computer readable medium may include at least one set of instructions for situation awareness. When executed by at least one processor of a computing device, the at least one set of instructions may direct the at least one processor to perform operations including obtaining, from at least one of one or more sensors, environmental data associated with an environment corresponding to a first time point and generating a first static global representation of an environment corresponding to the first time point based at least in part on the environmental data. The first static global representation may indicate a first state of one or more static elements in the environment. The operations may further include generating a first dynamic global representation of the environment corresponding to the first time point based at least in part on the environmental data and estimating, based on the first static global representation and the first dynamic global representation, a target state of the environment at a target time point using a target estimation model. The first dynamic global representation may indicate a first state of one or more moving elements in the environment.

According to still another aspect of the present disclosure, a non-transitory computer readable medium is provided. The non-transitory computer readable medium may include at least one set of instructions, wherein when executed by at least one processor of a computing device, the at least one set of instructions direct the at least one processor to perform operations including obtaining environmental data acquired by at least one of one or more sensors and obtaining a second dynamic global representation of a second state of the environment corresponding to a second time point. The second time point may be different from the first time point. The environmental data may be associated with the environment corresponding to a first time point. The operations may further include generating update information associated with the environment based at least in part on the environmental data. The update information may indicate a difference between a status of one or more moving elements in the environment at the first time point and a status of one or more moving elements in the environment at the second time. The operations may further include generating, based on the second dynamic global representation, an estimated dynamic global representation of an estimated state of the environment at the first time point, and generating, based on the update information and the estimated dynamic global representation, a first dynamic global representation of a first state of the environment at the first time point. The first dynamic global representation may indicate a status of each of the one or more moving elements in the environment at the first time point.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the term "system," "engine," "unit," "module," and/or "block" used herein are one method to distinguish different components, elements, parts, sections or assembly of different levels in ascending order. However, the terms may be displaced by other expressions if they may achieve the same purpose.

Figure 2:
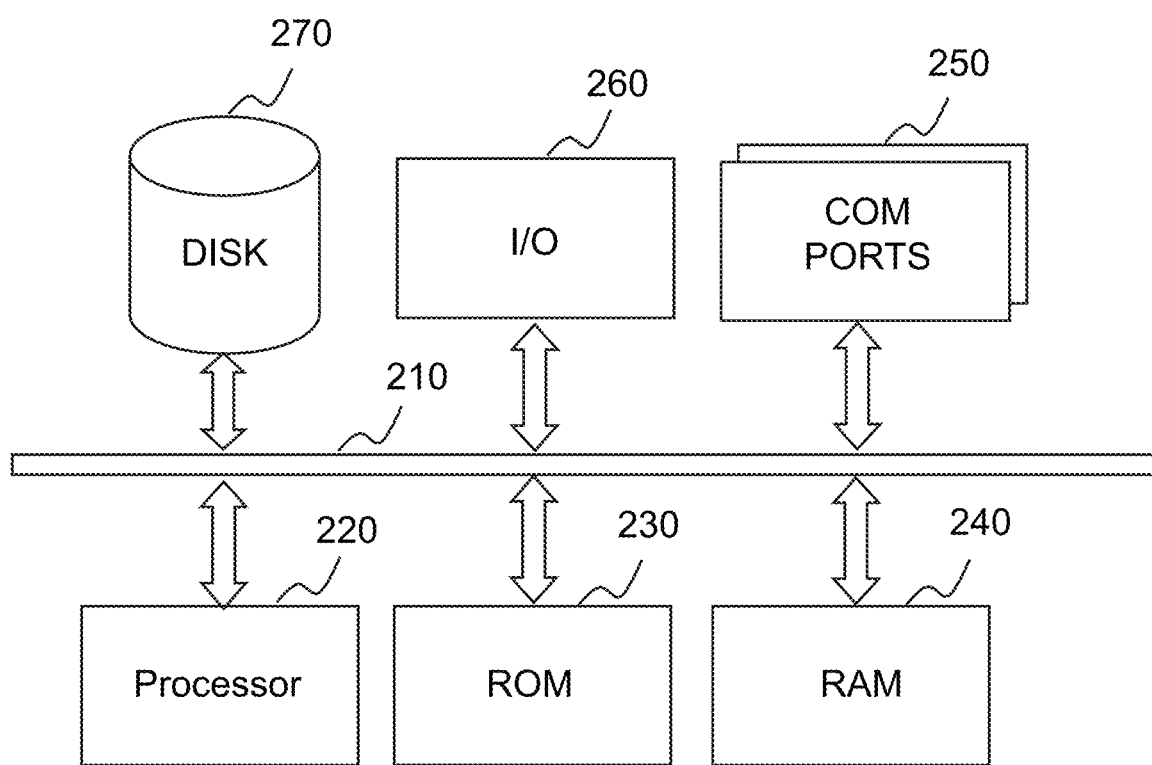
FIG. 2 is a schematic diagram illustrating exemplary hardware and/or software components of an exemplary computing device according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage devices. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 210 as illustrated in FIG. 2) may be provided on a computer readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules (or units or blocks) may be included in connected logic components, such as gates and flip-flops, and/or can be included in programmable units, such as programmable gate arrays or processors. The modules (or units or blocks) or computing device functionality described herein may be implemented as software modules (or units or blocks) but may be represented in hardware or firmware. In general, the modules (or units or blocks) described herein refer to logical modules (or units or blocks) that may be combined with other modules (or units or blocks) or divided into sub-modules (or sub-units or sub-blocks) despite their physical organization or storage.

It will be understood that when a unit, engine, module, or block is referred to as being "on," "connected to," or "coupled to" another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

In addition, it should be understood that in the description of the present disclosure, the terms "first", "second", or the like, are only used to distinguish the purpose of description, and cannot be interpreted as indicating or implying relative importance, nor can be understood as indicating or implying the order.

An aspect of the present disclosure relates to systems and/or methods for updating a dynamic global representation of the environment. Environmental data associated with an environment (e.g., a street, a scan room) corresponding to a first time point may be obtained from at least one of one or more sensors. To generate an updated dynamic global representation (also referred to as a "first dynamic global representation") of the environment at a first time point, a second dynamic global representation of the environment at a second time point is obtained. The first time point may be, for example, later than the second time point. Update information associated with the environment at the first time point may be generated based at least in part on the environmental data at the first time point. An estimated dynamic global representation of the first state of the environment may be generated based on a time difference between the first time point and the second time point. In some cases, the one or more sensors may be configured to acquire data from different portions of the environment and/or at different time intervals. The environmental data at the first time point may correspond to a portion of the environment. By aggregating the estimated dynamic global representation and the second dynamic global representation to generate the first dynamic global representation, the dynamic information of each of one or more moving elements in the environment at the first time point may be determined in a relatively accurate way. Thus, the systems and methods for updating the dynamic global representation may be scalable and/or adaptable to various environments.

Another aspect of the present disclosure relates to systems and/or methods for estimating a target state of an environment at a target time point. Environmental data associated with an environment (e.g., a street, a scan room) corresponding to a first time point may be obtained from at least one of one or more sensors. A first static global representation of the environment may be generated based at least in part on the environmental data at the first time point. The first static global representation of the environment may indicate a first state of one or more static elements in the environment. A first dynamic global representation of the environment may also be generated based at least in part on the environmental data at the first time point. The first dynamic global representation of the environment may indicate a first state of one or more moving elements in the environment. The environmental data may be acquired by a plurality of sensors in which different sensors may acquire environmental data of a portion of the environment and/or at different time points or intervals. The first static global representation and the first dynamic global representation may be fused to generate a joint global representation of the environment. The target state of the environment may be estimated based on the joint global representation of the environment using a target estimation model, such as a recurrent neural network (RNN) model. Instead of tracking one or more elements in an environment over time, the target estimation model may be trained to estimate or predict the status of such one or more elements in an environment or a change thereof at a target time point based on status information of the one or more elements in the environment at another time point. By separately representing static information and dynamic information in the environment and fusing the static information and the dynamic information in the environment to obtain the joint global representation of the environment, a more accurate state of the environment at the first time point may be represented (as compared to some existing methods). Thus, the target state (e.g., a future state) of the environment may be more accurately estimated.

Such systems and methods do not require the one or more sensors to be of the same type or to acquire data associated with the environment at the same time intervals. Detection regions of at least two of the one or more sensors may overlap or not, which makes it easier for determining positions for placing the one or more sensors. Thus, the systems and methods for situation awareness may also be scalable and/or adaptable to various environments.

Figure 1:
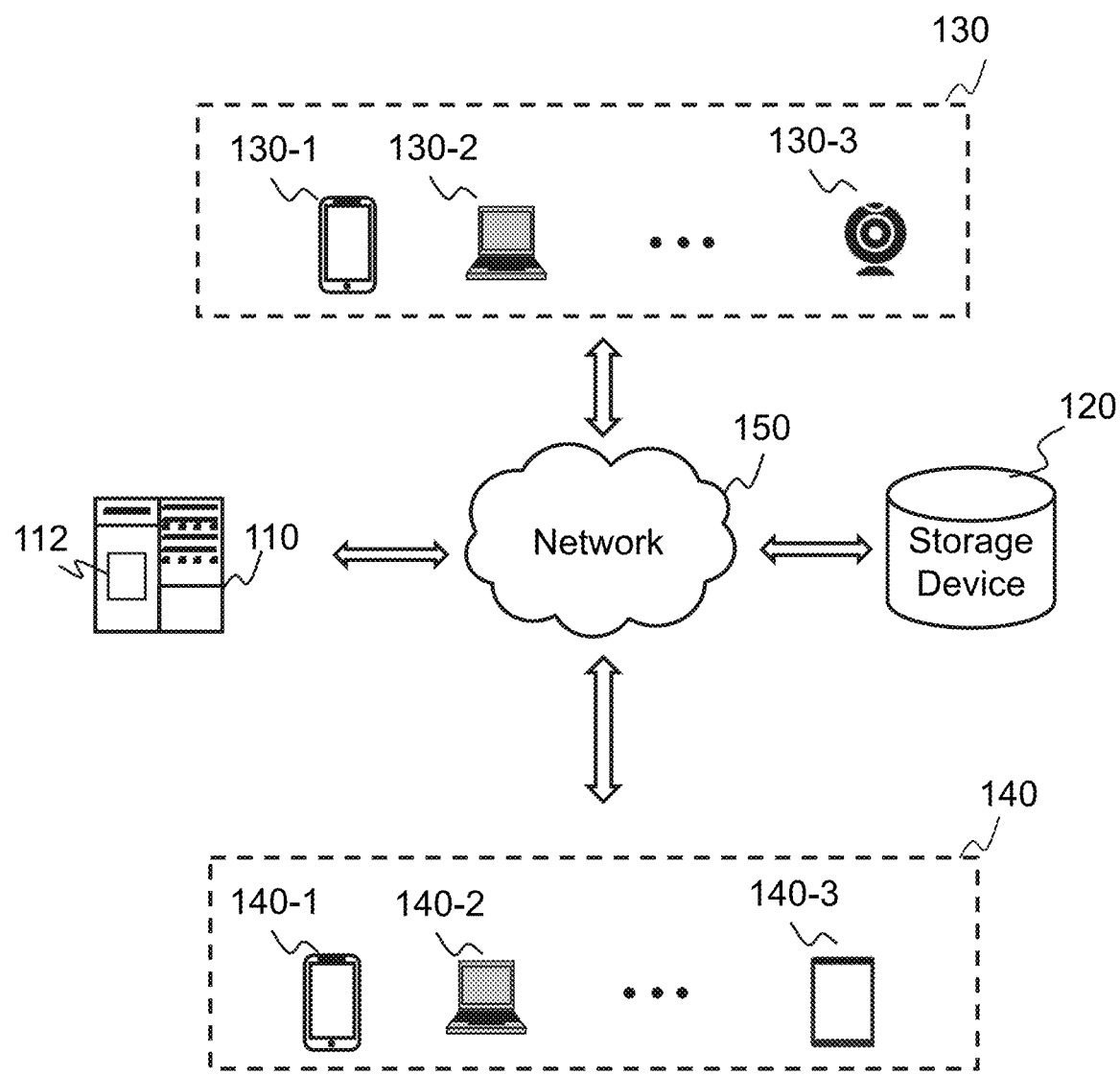
FIG. 1 is a schematic diagram of an exemplary system for situation awareness according to some embodiments of the present disclosure.

FIG. 1 illustrates a schematic diagram of an exemplary system for situation awareness according to some embodiments of the present disclosure. As shown, the system 100 may include a server 110, a storage device 120, one or more sensors 130, a user terminal 140, and a network 150.

The server 110 may process information and/or data relating to the system 100 to perform one or more functions described in the present disclosure. In some embodiments, the server 110 may include one or more processing devices 112 (e.g., single-core processing device(s) or multi-core processor(s)). In some embodiments, the processing device 112 may be configured to estimate a target state of an environment at a target time point. For example, the target time point may be a future time point. The processing device 112 may generate a first static global representation of an environment corresponding to the first time point based at least in part on the environmental data. The processing device 112 may generate a first dynamic global representation of the environment corresponding to the first time point based at least in part on the environmental data. The processing device 112 may further estimate the target state of the environment at the target time point based on the first static global representation and the first dynamic global representation. Merely byway of example, the processing device 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The server 110 may be a single server or a server group. The server group may be centralized, or distributed (e.g., server 110 may be a distributed system). In some embodiments, the server 110 may be local or remote. For example, the server 110 may access information and/or data stored in the sensor(s) 130, and/or the storage device 120 via the network 150. As another example, the server 110 may be directly connected to the sensor(s) 130, and/or the storage device 120 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 of the present disclosure.

The storage device 120 may store data and/or instructions. The data and/or instructions may be obtained from, for example, the server 110, the sensor(s) 130, and/or any other component of the system 100.

In some embodiments, the storage device 120 may store data and/or instructions that the server 110 may execute or use to perform exemplary methods described in the present disclosure. For example, the storage device 120 may store environmental data acquired by the one or more sensors 130. As another example, the storage device 120 may store a target estimation model. As yet another example, the storage device 120 may store static global representations corresponding to different time points and dynamic global representations corresponding to different time points. In some embodiments, the storage device 120 may include a mass storage, a removable storage, a volatile read-and-write memory, a read-only memory (ROM), or the like, or any combination thereof. Exemplary mass storage may include a magnetic disk, an optical disk, solid-state drives, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, storage device 120 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 120 may be connected to the network 150 to communicate with one or more components of the system 100 (e.g., the server 110, the sensor(s) 130). One or more components of the system 100 may access the data or instructions stored in the storage device 120 via the network 150. In some embodiments, the storage device 120 may be directly connected to or communicate with one or more components of the system 100 (e.g., the server 110, the sensor(s) 130). In some embodiments, the storage device 120 may be part of another component of the system 100, such as the server 110, the sensor(s) 130, or the user terminal 140.

In some embodiments, one or more components of the system 100 (e.g., the server 110, the sensor(s) 130) may have permission to access the storage device 120. For example, the server 110 or the user terminal 140 may obtain the static global representations and the dynamic global representations stored in the storage device 120.

The sensor(s) 130 may include one or more suitable devices that are capable of acquiring data associated with the environment. As used herein, the term "sensor" generally refers to a device/module that is able to acquire data from an environment. In some embodiments, the sensor(s) 130 may include a mobile phone 130-1, a computer 130-2, a camera 130-3, etc. The computer 130-2 may include but not limited to a laptop, a tablet computer, a desktop, or the like, or any combination thereof. The mobile phone 130-1 and the computer 130-2 may include one or more cameras, one or more ultrasonic sensors, and/or other sensors. The camera 130-3 may include but not limit to a gun camera, a dome camera, an integrated camera, a monocular camera, a binocular camera, a multi-view camera, a black-white camera, a color camera (such as a Red-Green-Blue camera), an infrared camera, or the like, or any combination thereof. Additionally or alternatively, the sensor(s) 130 may include other devices able to acquire data form the environment, such as a radar. In some embodiments, the system 100 may include a plurality of sensors 130. At least two of the plurality of sensors 130 may be configured to acquire data associated with the environment or a portion thereof at different time intervals. The at least two of the plurality of sensors may emit acquired data to the processor 112 asynchronously. In some embodiments, at least two of the plurality of sensors may be of the same type or of different types. In some embodiments, data acquired by the sensor(s) 130 may include image data. The image data acquired by the sensor(s) 130 may be a single image or a frame of a video. In some embodiments, the sensor(s) 130 may include a plurality of components each of which can acquire an image. For example, the sensor(s) 130 may include a plurality of sub-cameras that can take pictures or videos simultaneously.

The user terminal 140 may be associated with a user. Exemplary terminal devices 140 may include a mobile phone 140-1, a computer 140-2, a tablet computer 140-3, or the like. In some embodiments, the user terminal 140 may be and/or include any suitable device that can display or output information in a human-readable form, such as text, image, audio, video, graph, animation, or the like, or any combination thereof. In some embodiments, the user may view information and/or input data and/or instructions via the user terminal 140. For example, the user may view the estimated target state of the environment on a display device of the user terminal 140. As another example, the user terminal 140 may generate an alert to notify the user that an abnormal situation is likely to occur within a period of time (e.g., 5 seconds). The display device of the user terminal 140 may include a cathode ray tube (CRT) display, a liquid crystal display (LCD), a light emitting diode (LED) display, a plasma display panel (PDP), a 3D display, or the like. In some embodiments, the user terminal 140 may be connected to one or more components of the system 100 (e.g., the server 110, the storage device 120, the sensor(s) 130) via the network 150, such as a wireless network or a wired network (e.g., a coaxial cable network).

The network 150 may include any suitable network that can facilitate the exchange of information and/or data for the system 100. In some embodiments, one or more components in the system 100 (e.g., the server 110, the storage device 120, and the sensor(s) 130) may send information and/or data to another component(s) in the system 100 via the network 150. For example, the server 110 may obtain/acquire data associated with the environment or a portion thereof from the sensor(s) 130 via the network 150. In some embodiments, the network 150 may be any type of wired or wireless network, or combination thereof. Merely by way of example, the network 150 may include a cable network (e.g., a coaxial cable network), a wireline network, an optical fiber network, a telecommunications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. It should be noted that the above description is merely provided for the purposes of illustration, and not intended to limit the scope of the present disclosure. For persons having ordinary skills in the art, multiple variations and modifications may be made under the teachings of the present disclosure. For example, the processing device 112 may be integrated into the user terminal 140. However, those variations and modifications do not depart from the scope of the present disclosure.

FIG. 2 is a schematic diagram illustrating exemplary hardware and/or software components of an exemplary computing device according to some embodiments of the present disclosure. In some embodiments, the server 110 may be implemented on the computing device 200 shown in FIG. 2. In some embodiments, the processing device 112 may be implemented on the computing device 200 and configured to perform functions of the processing device 112 disclosed in this disclosure. For example, the computing device 200 may be configured to estimate a target state of an environment at a target time point. As another example, the computing device 200 may update a dynamic global representation of the environment.

The computing device 200 may be used to implement any component of the system 100 as described herein. For example, the processing device 112 may be implemented on the computing device 200, via its hardware, software program, firmware, or a combination thereof. Although only one such computer is shown, for convenience, the computer functions relating to image processing as described herein may be implemented in a distributed fashion on a number of similar platforms to distribute the processing load.

The computing device 200, for example, may include COM ports 250 connected to and from a network connected thereto to facilitate data communications. The computing device 200 may also include a processor (e.g., the processor 220), in the form of one or more processors (e.g., logic circuits), for executing program instructions. For example, the processor 220 may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The exemplary computing device may further include program storage and data storage of different forms including, for example, a disk 270, and a read-only memory (ROM) 230, or random-access memory (RAM) 240, for various data files to be processed and/or transmitted by the computing device. The exemplary computing device may also include program instructions stored in the ROM 230, RAM 240, and/or another type of non-transitory storage medium to be executed by the processor 220. The methods and/or processes of the present disclosure may be implemented as the program instructions. The computing device 200 may also include an I/O component 260, supporting input/output between the computer and other components. The computing device 200 may also receive programming and data via network communications.

Merely for illustration, only one processor is illustrated in FIG. 2. Multiple processors 220 are also contemplated; thus, operations and/or method steps performed by one processor 220 as described in the present disclosure may also be jointly or separately performed by the multiple processors. For example, if in the present disclosure the processor 220 of the computing device 200 executes both step A and step B, it should be understood that step A and step B may also be performed by two different processors 220 jointly or separately in the computing device 200 (e.g., a first processor executes step A and a second processor executes step B or the first and second processors jointly execute steps A and B).

Figure 3:
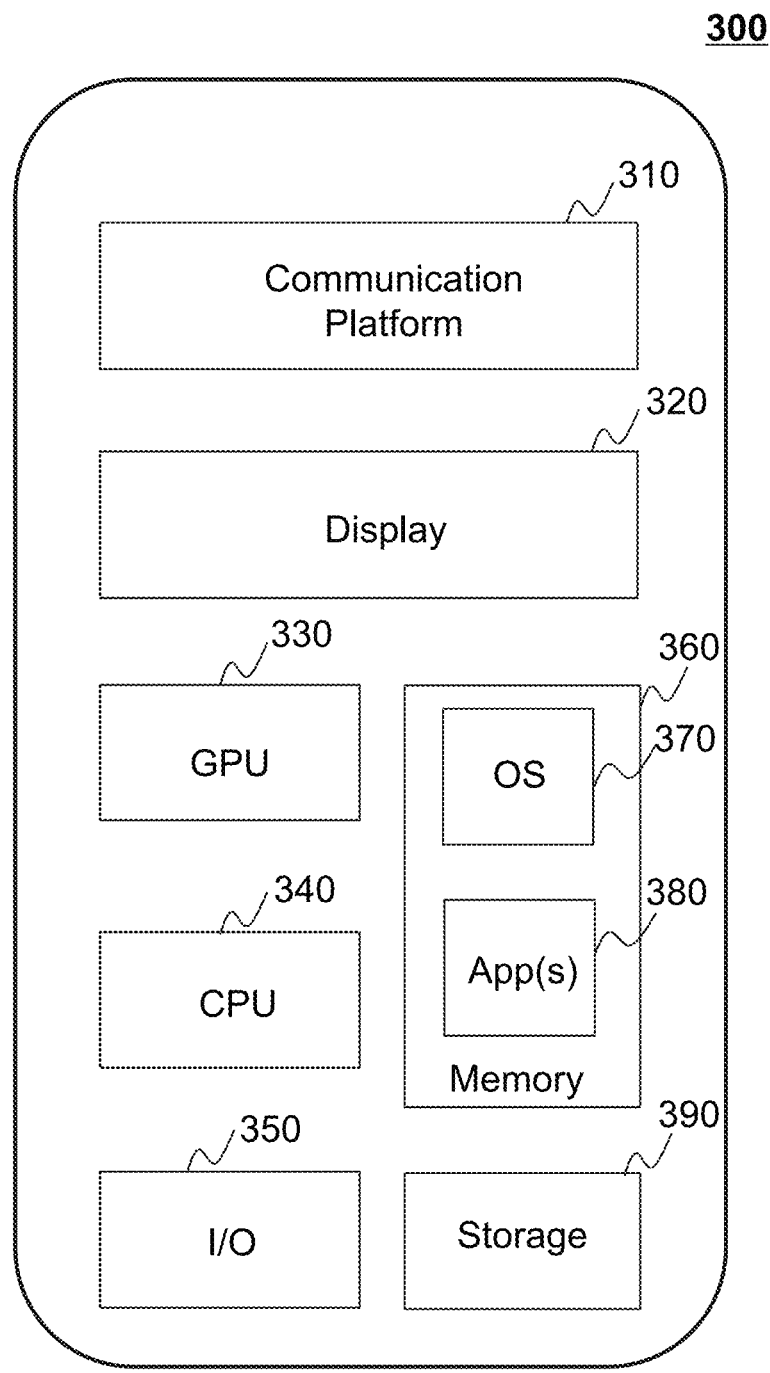
FIG. 3 is a schematic diagram illustrating an exemplary terminal device according to some embodiments of the present disclosure.

FIG. 3 is a schematic diagram illustrating an exemplary terminal device according to some embodiments of the present disclosure. In some embodiments, the user terminal 140 may be implemented on the terminal device 300 shown in FIG. 3. The terminal device 300 may be a mobile device, such as a mobile phone of a passenger or a driver, a built-in device on a vehicle driven by the driver. As illustrated in FIG. 3, the terminal device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the terminal device 300.

In some embodiments, an operating system 370 (e.g., iOS™, Android™, Windows Phone™, etc.) and one or more Apps (applications) 380 may be loaded into the memory 360 from the storage 390 in order to be executed by the CPU 340. User interactions may be achieved via the I/O 350 and provided to the server 110 and/or other components of the system 100 via the network 120. The terminal device 300 may transmit/receive data related to the image to be processed via the communication platform 310. For example, the terminal device 300 may receive a target state of the environment at a target time that is estimated by the server 110 via the communication platform 310.

Figure 4:
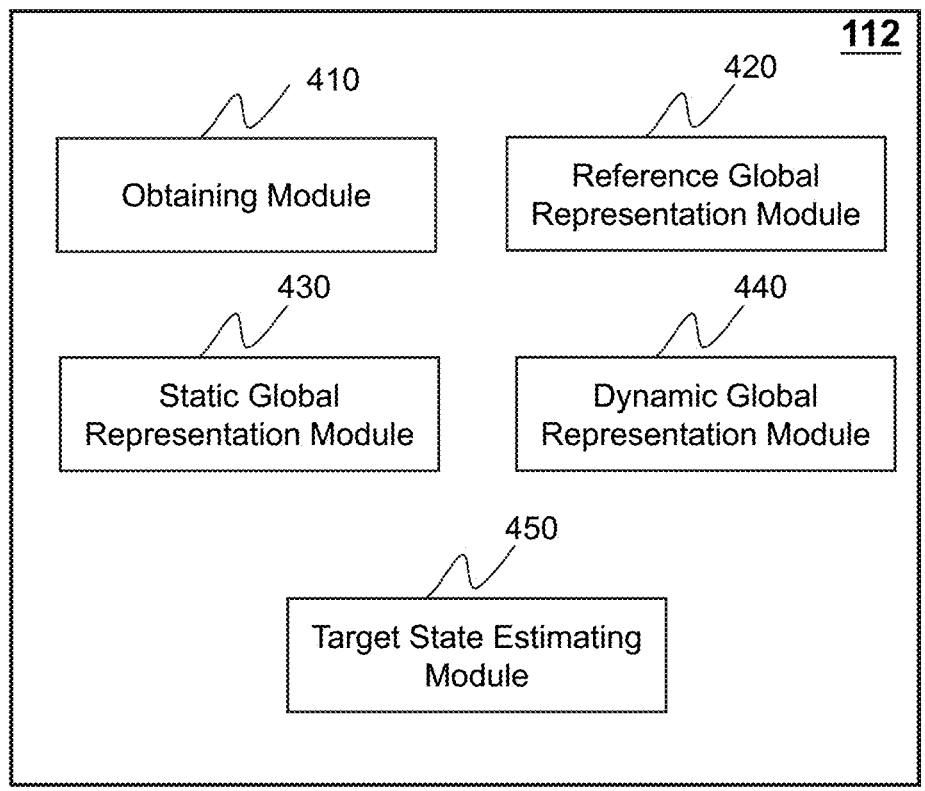
FIG. 4 is a block diagram illustrating an exemplary processing device according to some embodiments of the present disclosure.

FIG. 4 is a block diagram illustrating an exemplary processing device according to some embodiments of the present disclosure. In some embodiments, the processing device 112 may be implemented on server 110. The processing device 112 may communicate with a storage medium (e.g., the storage device 120 of the system 100, and/or the storage 390 of the terminal device 300), and may execute instructions stored in the storage medium. In some embodiments, the processing device 112 may include an obtaining module 410, a reference global representation module 420, a static global representation module 430, a dynamic global representation module 440, and a target state estimating module 450.

The obtaining module 410 may acquire data from one or more sensors, the storage device, and/or other components of the system 100. In some embodiments, the obtaining module 410 may obtain environmental data associated with an environment corresponding to a first time point from at least one of one or more sensors. For example, the environment may be an indoor environment. As another example, the environment may be an outdoor environment. In some embodiments, one or more sensors may be present in the environment for detecting the environmental data. As used herein, the term "environmental data" refers to data associated with one or more elements in the environment. For example, the environmental data may contain image data including spatial position(s), shape(s), and/or size(s) of the one or more elements at different time points. As another example, the environmental data may contain radio wave signals that include position information associated with one or more elements in the environment.

The reference global representation module 420 may generate a first reference global representation of the environment at a first time point. The first reference global representation may indicate a first state of the environment corresponding to the first time point. In some embodiments, the first static global representation may be generated by aggregating the first reference global representation with the second static global representation using a trained static-update neural network. The first reference global representation may include static information associated with one or more static elements in the environment at the first time point and dynamic information associated with one or more static elements in the environment at the first time point. In some embodiments, the reference global representation module 420 may perform a feature extraction operation on the environmental data to obtain one or more feature vectors representing data associated with the environment. For instance, the feature extraction operation may be performed using a convolution neural network model. In some embodiments, the reference global representation module 420 may further un-project the one or more feature vectors to determine the section of the second static global representation that corresponds to the portion of the environment. The one or more feature vectors may be converted into a three-dimensional (3D) representation (e.g., a 3D tensor representation) of the portion of the environment using an encoder. The 3D representation may be rotated and registered with the second reference global representation. In some embodiments, the section of the second reference global representation may be determined based on the registration between the 3D representation and the second reference global representation. The first reference global representation may be determined by updating the section of the second reference global representation based on the 3D representation of the portion of the environment using the trained reference-update neural network model. In some embodiments, the section of the second reference global representation may be determined based on the location(s) of the at least one of the one or more sensors. For example, when a sensor is located at a fixed position, the location of the sensor may be pre-calibrated. When the sensor is located at a predictable non-fixed position (e.g., on a movable component of which the moving trajectory is known), the location of the sensor may be estimated.

The static global representation module 430 may generate a first static global representation of the environment at the first time point. In some embodiments, the static global representation module 430 may obtain a second static global representation of a second state of the environment at a second time point. The second time point may be different from the first time point. For example, the second time point may be earlier than the first time point. The static global representation module 430 may generate a first reference global representation of the first state of the environment corresponding to the first time point. The first static global representation may be generated by aggregating the first reference global representation with the second static global representation using a trained static-update neural network. The first reference global representation may include static information associated with one or more static elements in the environment at the first time point and dynamic information associated with one or more static elements in the environment at the first time point. The static elements refer to elements that remain relatively still between the first time point and the second time point, and the moving elements refer to elements whose positions change between the first time point and the second time point. The static global representation module 430 may further generate the first static global representation by aggregating the first reference global representation with the second static global representation.

The dynamic global representation module 440 may generate a first dynamic global representation of the environment at the first time point. The first dynamic global representation may indicate a first state of one or more moving elements in the environment. The dynamic global representation module 440 may obtain a second dynamic global representation of a second state of the environment corresponding to the second time point. The dynamic global representation module 440 may generate update information associated with the environment based at least in part on the environmental data corresponding to the first time point. As used herein, the term "update information" refers to information associated with movement of the one or more moving elements. The dynamic global representation module 440 may generate an estimated dynamic global representation of the first state of the environment based on the second dynamic global representation. The estimated dynamic global representation may indicate an estimated state of the one or more moving elements in the environment at the first time point. The first dynamic global representation of the first state of the environment may be generated based on the update information and the estimated dynamic global representation.

The target state estimating module 450 may estimate a target state of the environment at a target time point. The target time point may be different from the first time point and the second time point. For example, the first time point may be later than the second time point, and the target time point may be a future time point. The target state may be a future state of the environment. For example, the target state may include whether an abnormal situation is likely to occur at the target time point. In some embodiments, the target estimation model may be a trained machine learning model, such as a trained neural network model. The trained neural network model may include a recurrent neural network (RNN) model, such as a long short term memory (LSTM) model, a gated recurrent unit (GRU) model, a continuous time recurrent neural network (CTRNN) model, or the like, or any combination thereof. In some embodiments, the target state estimating module 450 may generate a joint global representation of the first state of the environment corresponding to the first time point by fusing the first static global representation and the first dynamic global representation. For example, the first static global representation and the first dynamic global representation may be respectively converted into one or more feature vectors using an encoder (e.g., a convolutional network model). A joint global representation may be generated by fusing the feature vectors corresponding to the first static global representation and the first dynamic global representation using a Concat layer of the trained neural network model. For instance, the joint global representation may be in the form of one or more joint feature vectors. The target state estimating module 450 may determine, based on the joint global representation, a target probability using the trained neural network model. The target probability may be a probability that an abnormal situation is likely to occur in the environment at the target time point.

The modules in FIG. 4 may be connected to or communicate with each other via a wired connection or a wireless connection. The wired connection may include a metal cable, an optical cable, a hybrid cable, or the like, or a combination thereof. The wireless connection may include a Local Area Network (LAN), a Wide Area Network (WAN), a Bluetooth, a ZigBee, a Near Field Communication (NFC), or the like, or a combination thereof. In some embodiments, two or more of the modules may be combined into a single module, and any one of the modules may be divided into two or more units. In some embodiments, one or more additional modules may be included in the processing device 112. For example, the processing device 112 may further include a transmission module, configured to transmit information associated with the target state to the user terminal 140.

Figure 5:
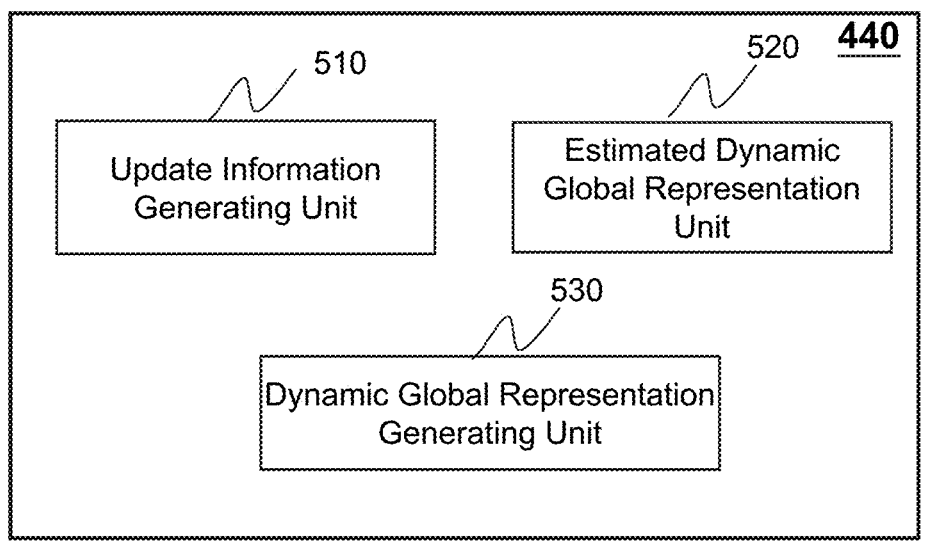
FIG. 5 is a block diagram illustrating an exemplary dynamic global representation module according to some embodiments of the present disclosure.

FIG. 5 is a block diagram illustrating an exemplary dynamic global representation module according to some embodiments of the present disclosure. In some embodiments, the dynamic global representation module 440 may be implemented on the server 110 (e.g., the processing device 112). The dynamic global representation module 440 may communicate with a storage medium (e.g., the storage device 120 of the system 100, and/or the storage 390 of the terminal device 300), and may execute instructions stored in the storage medium. In some embodiments, the processing device 112 may include an update information generation unit 510, an estimated dynamic global representation unit 520, and a dynamic global representation generating unit 530.

Figure 8:
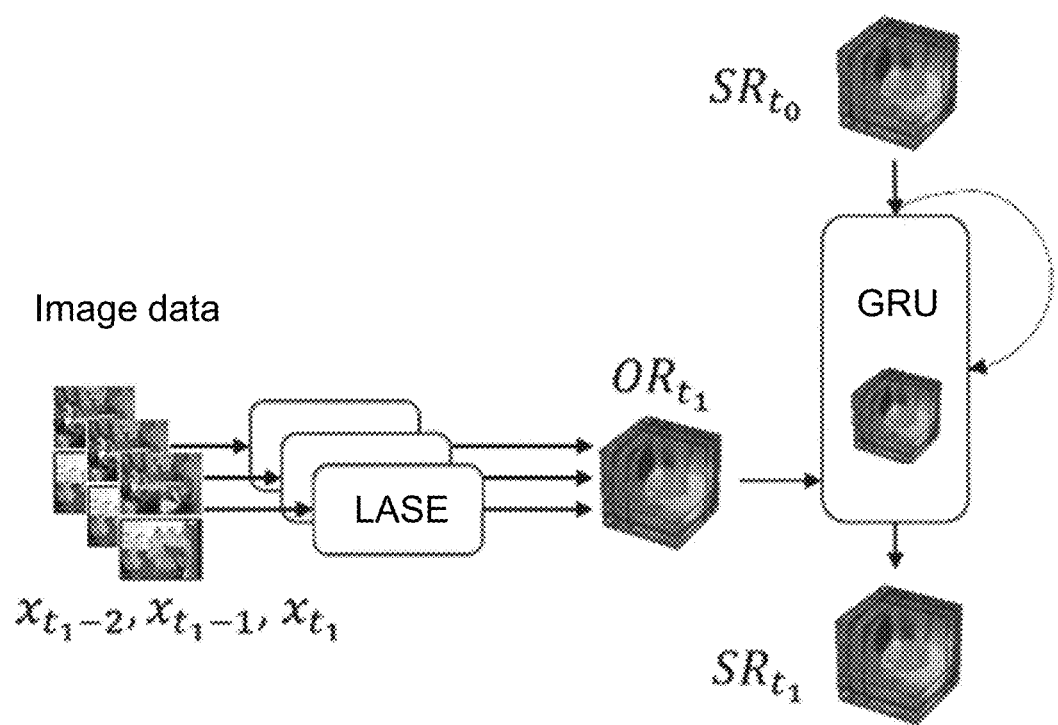
FIG. 8 is a schematic diagram illustrating an exemplary process for generating a reference global representation of the environment and the first static global representation according to some embodiments of the present disclosure.

The update information generation unit 510 may generate update information associated with the environment based at least in part on the environmental data. As used herein, the term "update information" refers to dynamic information associated with one or more moving elements in the environment at the first time point. In some embodiments, the update information generation unit 510 may generate the update information by comparing the first reference global representation (e.g., $OR_{t_1}$ as shown in FIG. 8) of the environment at the first time point with a second reference global representation of the environment at a second reference time point. The second reference time point may be between the first time point and the second time point. In some embodiments, the update information may indicate a difference between the first reference global representation and the second reference global representation.

The estimated dynamic global representation unit 520 may generate an estimated dynamic global representation of the first state of the environment based on the second dynamic global representation. The estimated dynamic global representation may indicate an estimated status of each of one or more moving elements in the environment at the first time point. In some embodiments, the estimated dynamic global representation unit 520 may determine a time difference (e.g., $\Delta t_1$ in FIG. 10) between the second time point and the first time point. The estimated dynamic global representation unit 520 may generate the estimated dynamic global representation (e.g., $\widetilde{DR}_{t_1}$ in FIG. 10) based on the time difference using a trained dynamic-estimation neural network model. In some embodiments, the trained dynamic-estimation neural network model may include one or more convolution layers for generating one or more feature vectors associated with the second dynamic global representation. The trained dynamic-estimation neural network may further include one or more LSTM layers for generating one or more estimated feature vectors for the estimated dynamic global representation. The one or more estimated feature vectors may be further converted to the estimated dynamic global representation, for example, by one or more deconvolution layers in the trained dynamic-estimation neural network.

The dynamic global representation generating unit 530 may generate, based on the update information and the estimated dynamic global representation, a first dynamic global representation of the first state of the environment. In some embodiments, the first dynamic global representation may be generated by aggregating the update information and the estimated dynamic global representation using a trained dynamic-update neural network model. The trained dynamic-update neural network model may include an RNN model, such as an LSTM model, a GRU model, a CTRNN model, or the like, or any combination thereof. In some embodiments, the trained dynamic-update neural network model may be obtained from the storage device 120. In some embodiments, the trained dynamic-update neural network model may be obtained by training a dynamic-update neural network model with training data.

The units in FIG. 5 may be connected to or communicate with each other via a wired connection or a wireless connection. The wired connection may include a metal cable, an optical cable, a hybrid cable, or the like, or a combination thereof. The wireless connection may include a Local Area Network (LAN), a Wide Area Network (WAN), a Bluetooth, a ZigBee, a Near Field Communication (NFC), or the like, or a combination thereof. In some embodiments, two or more of the units may be combined into a single module, and any one of the units may be divided into two or more sub-units. In some embodiments, the dynamic global representation module 440 may include one or more additional units. For example, the dynamic global representation unit 440 may further include an obtaining unit configured to obtain the second dynamic global representation.

Figure 6:
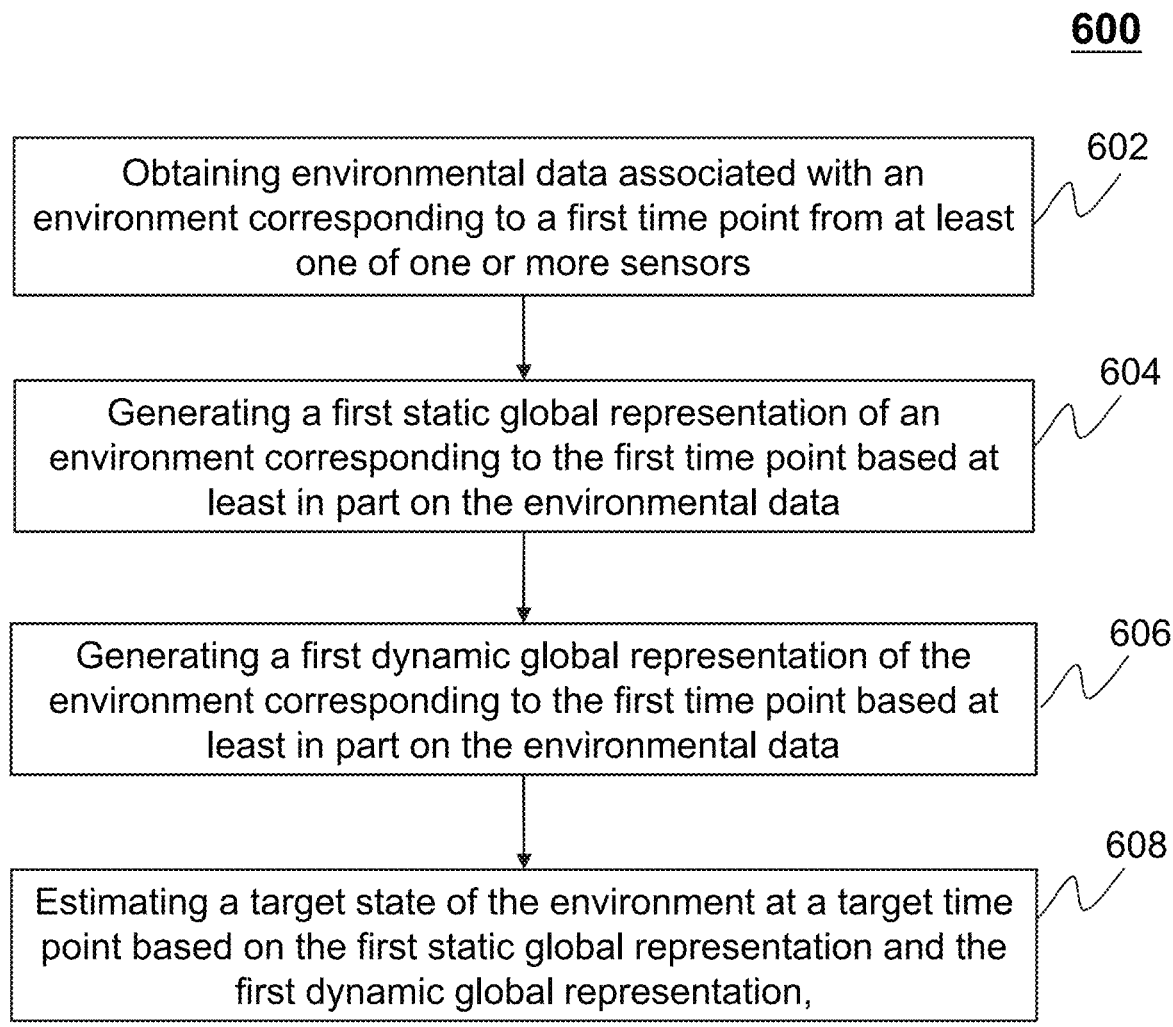
FIG. 6 is a flowchart of an exemplary process for estimating a target state of an environment at a target time point according to some embodiments of the present disclosure.

FIG. 6 is a flowchart of an exemplary process for estimating a target state of an environment at a target time point according to some embodiments of the present disclosure. In some embodiments, the process 600 may be executed by system 100. For example, the process 600 may be implemented as a set of instructions (e.g., an application) stored in the storage (e.g., ROM 230 or RAM 240 of the computing device 200). The processing device 112, the modules in FIG. 4, and/or the units in FIG. 5 may execute the set of instructions. When the set of instructions is performed, the process 600 may be executed. The operations of the illustrated process 600 presented below are intended to be illustrative. In some embodiments, the process 600 may be accomplished with one or more additional operations not described, and/or without one or more of the operations discussed. Additionally, the order in which the operations of the process 600 as illustrated in FIG. 6 and described below is not intended to be limiting.

In 602, the processing device 112 (e.g., the obtaining module 410) may obtain environmental data associated with an environment corresponding to a first time point from at least one of one or more sensors. For example, the environment may be an indoor environment, such as an operation room for performing surgery for a patient, a scan room for performing a scan of an object (e.g., a patient), a factory, a recreation room, a gym, a recovery center, or the like. As another example, the environment may be an outdoor environment, such as a bus station, a street, airport runways, airspace, or the like, or any combination thereof.

In some embodiments, one or more sensors may be present in the environment for detecting the environmental data. As used herein, the term "environmental data" refers to data associated with one or more elements in the environment. For example, the environmental data may contain image data including spatial position(s), shape(s), and/or size(s) of the one or more elements at different time points. For instance, the one or more sensors may include a dome camera, a monocular camera, a binocular camera, a multi-view camera, a depth camera, a black-white camera, a color camera, an infrared camera, or the like, or any combination thereof. As another example, the environmental data may contain radio wave signals that include position information associated with one or more elements in the environment. The one or more sensors may include a radar, a lidar, an ultrasonic sensor, or the like, or any combination thereof. In some embodiments, the one or more sensors may include one sensor configured to acquire data associated with at least a portion of the environment. In some embodiments, the one or more sensors may include a plurality of sensors.

In some embodiments, at least two of the plurality of sensors may be configured to acquire data associated with different portions of the environment. In some embodiments, the portion of the environment detected by each of the plurality of sensors may overlap the portion of the environment detected by another one of the plurality of sensors. In some embodiments, the portion of the environment detected by at least one sensor may have no overlapping area with the portion of the environment detected by any other sensors of the plurality of sensors. As a result, there may be an undetected portion in the environment that is undetectable by any of the plurality of sensors. In some embodiments, at least two of the plurality of sensors may be configured to acquire data associated with the environment or a portion thereof at different time intervals. The at least two of the plurality of sensors may emit acquired data to the processor 112 asynchronously. In some embodiments, at least two of the plurality of sensors may be of a same type or different types. For example, the plurality of sensors may include a black-white camera that acquires 20 image frames every second and a Red-Green-Blue (RGB) camera that acquires 10 image frames every second. In some embodiments, at least a portion of the plurality of sensors may be detachably or non-detachably mounted at a fixed position, such as on the ceiling of the operation room. In some embodiments, at least a portion of the plurality of sensors may be detachably or non-detachably mounted at a non-fixed position, such as on a movable part of a scanner (such as the X-ray generator, a mechanical arm of a medical robot). The locations of the plurality of sensors may be known or unknown. Thus, the methods described in the process 600, 700, and/or 900 may be adaptable to various environments.

In 604, the processing device 112 (e.g., the static global representation module 430) may generate a first static global representation of an environment corresponding to the first time point based at least in part on the environmental data. As used herein, the term "global representation" refers to a representation that indicates data associated with different portions of the environment. For example, the global representation may be in the form of a three-dimensional tensor. The first static global representation may indicate a first state of one or more static elements in the environment. In some embodiments, the processing device 112 may transmit the first static global representation to the user terminal 140 and/or the storage device 120. A user may view the first static global representation via the user terminal 140.

The environment may include one or more static elements that remain still during a period of time and one or more moving elements whose position(s) may change over time during the period of time. Accordingly, the environmental data may include static information associated with the one or more static elements and dynamic information associated with the one or more moving elements. As used herein, a static element refers to an element that is immobile with respect to a reference feature (e.g., the floor, a wall, the base of a scanner) for at least a period of time with respect to an acquisition rate at which environmental data relating to the element, or a portion thereof, are acquired, or moves at a rate much lower than the acquisition rate. For instance, the environment may be a scan room for performing a scan of a patient. One or more static elements in the scan room may include the wall, the floor, a light, a patient who remains still during a substantial portion of the scan, or the like, or any combination thereof. One or more moving elements (or referred to as a movable component) in the scan room may include an operator, at least a portion of a scanner (e.g., an x-ray generator that is moved to align with a part of the patient to be scanned).

In some embodiments, the processing device 112 may obtain a second static global representation of a second state of the environment at a second time point. The second time point may be different from the first time point. For example, the second time point may be earlier than the first time point. The processing device 112 may generate a first reference global representation of the first state of the environment corresponding to the first time point. The first static global representation may be generated by aggregating the first reference global representation with the second static global representation using a trained static-update neural network. The first reference global representation may include static information associated with one or more static elements in the environment at the first time point and dynamic information associated with one or more static elements in the environment at the first time point. The static elements refer to elements that remain relatively still between the first time point and the second time point, and the moving elements refer to elements whose positions change between the first time point and the second time point. The processing device 112 may further generate the first static global representation by aggregating the first reference global representation with the second static global representation. More details regarding the generation of the first static global representation may be found elsewhere in the present disclosure, for example, in FIG. 7, FIG. 8, and the description thereof.

In 606, the processing device 112 (e.g., the dynamic global representation module 440) may generate a first dynamic global representation of the environment corresponding to the first time point based at least in part on the environmental data. The first dynamic global representation may indicate a first state of one or more moving elements in the environment. The processing device 112 may obtain a second dynamic global representation of a second state of the environment corresponding to the second time point. The processing device 112 may generate update information associated with the environment based at least in part on the environmental data corresponding to the first time point. As used herein, the term "update information" refers to information associated with movement of the one or more moving elements. In some embodiments, the update information may indicate a difference between the status of the one or more moving elements at the second time and the status of the one or more moving elements at the second time. The processing device 112 may generate an estimated dynamic global representation of the first state of the environment based on the second dynamic global representation. The estimated dynamic global representation may indicate an estimated state of the one or more moving elements in the environment at the first time point. The first dynamic global representation of the first state of the environment may be generated based on the update information and the estimated dynamic global representation. More details regarding the generation of the first dynamic global representation may be found elsewhere in the present disclosure, for example, in FIG. 9, FIG. 10 and the descriptions thereof.

In 608, the processing device 112 (e.g., the target state estimating module 450) may estimate a target state of the environment at a target time point based on the first static global representation and the first dynamic global representation. The target time point may be different from the first time point and the second time point. For example, the first time point may be later than the second time point, and the target time point may be a future time point. The target state may be a future state of the environment. For example, the target state may include whether an abnormal situation is likely to occur at the target time point. It may be understood that the term "occur" refers to being present or coming into existence. For example, the target state may include whether an abnormal situation is likely to be present at the target time point (i.e., the abnormal situation is likely to happen before or at the target time point). As another example, the target state may include whether an abnormal situation is likely to happen at the target time point. As yet another example, the target state may further include information related to the abnormal situation, such as the position of one or more abnormal elements, the classification of the abnormal situation (e.g., a collision, a fight), etc.

In some embodiments, the abnormal situation may include a collision between two elements in the environment. For example, the collision may happen between a vehicle and another object (e.g., another vehicle, a pedestrian, a tree, or a roadblock). As another example, the collision may happen between a patient and a movable or unmovable part of a medical device (such as the X-ray generator, a mechanical arm of a medical robot, a gantry of a computerized tomography scanner). As yet another example, the collision may happen between different parts of one or more medical devices (e.g., between a gantry and a couch of a radiation therapy device). In some embodiments, the abnormal situation may include one or more abnormal activities, such as a fight between two children. In some embodiments, the abnormal situation may include that an estimated workflow (e.g., in a factory) at the target time point is different from a planned workflow.

Alternatively, the second time point may be later than the first time point, and the target time point may be a previous time point earlier than the first time point. The target state may include whether an abnormal situation was likely to have occurred at the target time point, which may find applications in, for example, analysis for the cause of an abnormal workflow, an accident, etc.

In some embodiments, the processing device 112 may generate a joint global representation of the first state of the environment corresponding to the first time point by fusing the first static global representation and the first dynamic global representation. For example, the first static global representation and the first dynamic global representation may be respectively converted into one or more feature vectors using an encoder (e.g., a convolutional network model). A joint global representation may be generated by fusing the feature vectors corresponding to the first static global representation and the first dynamic global representation. For instance, the joint global representation may be in the form of one or more joint feature vectors. The target state of the environment at the target time point may be estimated using a target estimation model. Merely by way of example, the target state may include whether a collision is likely to occur in the environment at the target time point.

In some embodiments, the target estimation model may include one or more algorithms for estimating whether a collision is likely to occur between two elements in the environment. For instance, the one or more algorithms may direct the processing device 112 to estimate movement information of each element based on data associated with the environment (e.g., image data) at two or more time points. The movement information may include whether the element is moving, a direction that the element is moving toward, a velocity of the element, or the like, or any combination thereof. The processing device 112 may be further directed by the target estimation model to estimate whether a collision is likely to occur between every two moving elements and/or between a moving element and a static element based on a distance between the two elements and movement information of each of the two elements. As another example, the target estimation model may include a fitting algorithm that directs the processing device 112 to estimate a fitting function that describes a trajectory of each element in the environment based on a plurality of positions of each element at different time points. The processing device 112 may determine whether a collision is likely to occur between two elements by determining if there is an intersection between the estimated trajectories of the two elements.

In some embodiments, the target estimation model may be a trained neural network model. The processing device 112 may determine, based on the joint global representation, a target probability using the trained neural network model. The target probability may be a probability that an abnormal situation is likely to occur in the environment at the target time point. In some embodiments, the first static global representation and the first dynamic global representation may be fused by a Concat layer of the trained neural network model. For instance, the trained neural network model may include a recurrent neural network (RNN) model, such as a long short term memory (LSTM) model, a gated recurrent unit (GRU) model, a continuous time recurrent neural network (CTRNN) model, or the like, or any combination thereof. The trained neural network model may further include a fully connected (FC) layer. In some embodiments, the FC layer may output a target probability that an abnormal situation is likely to occur in the environment at the target time point. In some embodiments, the FC layer may output a plurality of target probabilities corresponding to different types of abnormal situations. The processing device 112 may compare the target probability with a probability threshold. The probability threshold may be set according to default settings or modified according to various situations. For instance, the probability threshold may be 0.8, 0.75, or the like. In response to a determination that the target probability exceeds the probability threshold, the processing device 112 may further estimate that an abnormal situation is likely to occur in the environment at the target time point. Alternatively or additionally, the processing device 112 may estimate that the abnormal situation corresponding to the highest target probability among the plurality of target probabilities is likely to occur in the environment at the target time point.

In some embodiments, the target estimation model may be generated by training an initial target estimation model using training data associated with one or more sample environments. For example, the training data may include sample joint global representations associated with one or more sample environments at different time points. The training data may further include corresponding labels each indicating whether an abnormal situation occurs at a time point. In some embodiments, the target state of the environment may include a target state of an undetected portion of the environment that is undetectable by any one of the one or more sensors. In some embodiments, at least a portion of the plurality of sample environments may be similar to the environment of which the target state is to be estimated. That is, at least a portion of the plurality of sample environments may include at least one sample element that is similar to at least one element in the environment. One or more parameters of the one or more hidden layers of the target estimation model may relate to an estimated relationship between at least two elements of the environment. The target state of the undetected portion of the environment may be estimated by the one or more hidden layers of the target estimation model.

In some embodiments, the processing device 112 may further cause an alert related to the abnormal situation to be generated. For example, the processing device 112 may transmit signals encoding information related to the abnormal situation to the user terminal 140. The user terminal 140 may generate the alert to notify a user that the abnormal situation may occur at the target time point. The alert may be generated in the form of text messages, voice messages, graphical messages, alarm sounds, or the like, or any combination thereof. In some embodiments, the processing device 112 may further generate advisory information regarding the abnormal situation. For example, when the system 100 is used in traffic controlling or self-driving, and the abnormal situation is a collision, the advisory information may include decreasing the speed of the vehicle (e.g., an airplane, a car), adjusting the moving direction of the vehicle, or the like, or any combination thereof.

It should be noted that the above description is merely provided for the purposes of illustration, and not intended to limit the scope of the present disclosure. For persons having ordinary skill in the art, multiple variations and modifications may be made under the teachings of the present disclosure. However, those variations and modifications do not depart from the scope of the present disclosure.

Figure 7:
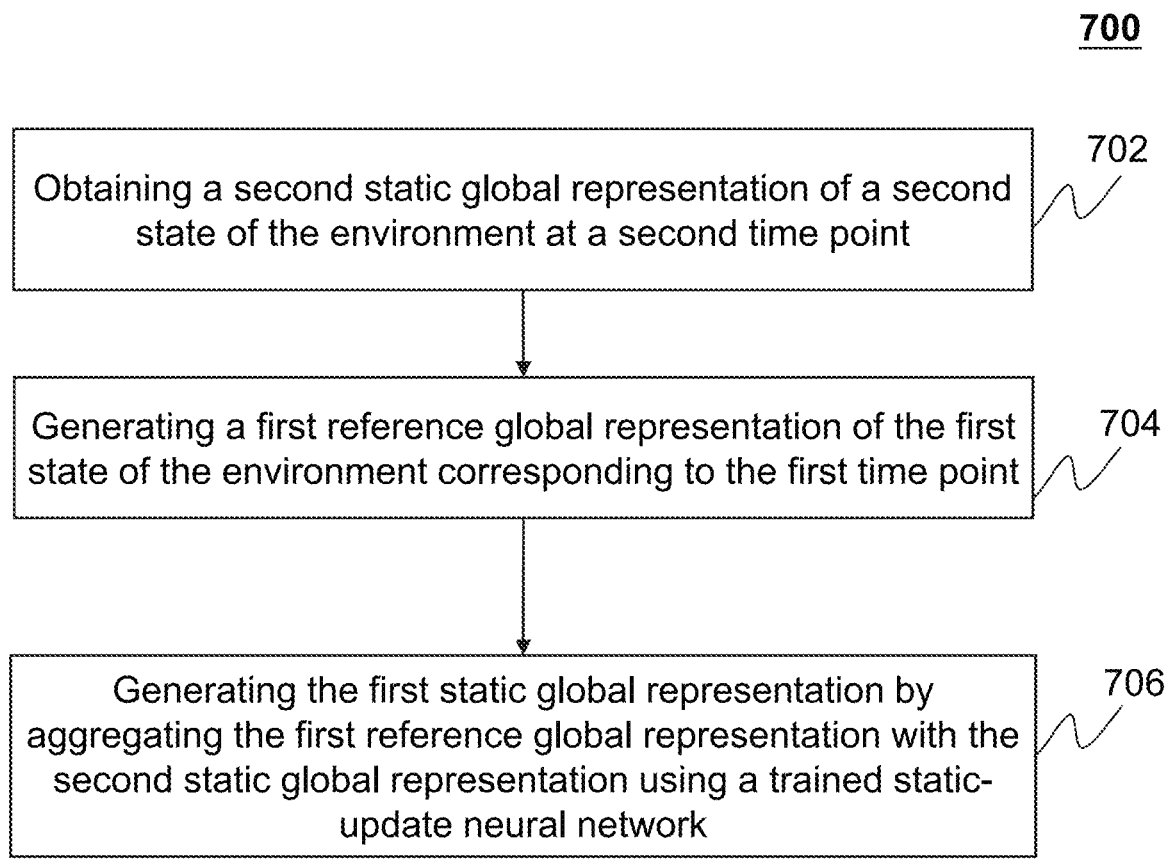
FIG. 7 is a flowchart of an exemplary process for generating a first static global representation of the environment according to some embodiments of the present disclosure.

FIG. 7 is a flowchart of an exemplary process for generating a first static global representation of the environment according to some embodiments of the present disclosure. FIG. 8 is a schematic diagram illustrating an exemplary process for generating a reference global representation of the environment and the first static global representation according to some embodiments of the present disclosure. In some embodiments, the process 700 may be executed by the system 100. For example, the process 700 may be implemented as a set of instructions (e.g., an application) stored in the storage (e.g., ROM 230 or RAM 240 of the computing device 200). The processing device 112, the modules in FIG. 4, and/or the units in FIG. 5 may execute the set of instructions. When the set of instructions are performed, the process 700 may be executed. The operations of the illustrated process 700 presented below are intended to be illustrative. In some embodiments, the process 700 may be accomplished with one or more additional operations not described, and/or without one or more of the operations discussed. Additionally, the order in which the operations of the process 700 as illustrated in FIG. 7 and described below is not intended to be limiting.

In 702, the processing device 112 (e.g., the static global representation module 430) may obtain a second static global representation of a second state of the environment at a second time point. For example, the second time point may be earlier than the first time point. In some embodiments, the static global representation of the environment may be updated over time using a trained static-update neural network model to obtain static global representations of the environment at different time points. In some embodiments, the static global representation may be updated if an update condition is satisfied. For example, the update condition may include that one or more sets of data associated with the environment have been received from a preset count of sensors since the second time point. Additionally or alternatively, the update condition may include that one or more sets of data associated with the environment corresponding to a preset count of reference time points have been received since the second time point. The update condition may be applied to control a frequency of updating the static global representation model, which may decease noise generated during the update (as compared to using each set of environmental data received from at least one of the one or more sensors for updating the static global representation model). Each of the reference time points is between the second time point and the first time point.

For example, as shown in FIG. 8, the second time point may be represented as t0, and the static global representation of the environment corresponding to the second time point (also referred to as the "second static global representation") may be represented as $SR_{t_0}$. For illustration purposes, the preset count of reference time points may be 2. Environmental data corresponding to two reference time points $t_1-2$ and $t_1-1$ are received. Environmental data corresponding to the first time point $x_{t_1}$ is also received. The second static global representation may be determined through one or more updates of an initial static global representation. Details regarding the update of the static global representation may be found elsewhere in the present disclosure, for example, in FIG. 8, operation 706 of FIG. 7, and the description thereof. Merely by way of example, the initial static global representation may be generated based on a set of environmental data received from at least one of the one or more sensors at an initial time point.

In 704, the processing device 112 (e.g., the static global representation module 430) may generate a first reference global representation of the first state of the environment corresponding to the first time point. The first reference global representation may include dynamic information associated with the environment and static information associated with the environment. In some embodiments, the reference global representation of the environment may be updated over time using a trained reference-update neural network to obtain reference global representations of the environment at different time points. For example, the trained reference-update neural network may include an RNN model, such as an LSTM model, a GRU model, a CTRNN model, or the like, or any combination thereof. As shown in FIG. 8, the second time point may be represented as $t_0$. The reference global representation of the environment corresponding to the first time point (also referred to as the "first reference global representation") may be represented as $OR_{t_1}$. The first reference global representation may be generated based on a second reference global representation corresponding to a reference time point. The reference time point may be between the first time point and the second time point.

In some embodiments, the environmental data at the first time point may correspond to a portion of the environment. To generate the first reference global representation, the processing device 112 may obtain environmental data associated with the environment at the first time point (e.g., image data $x_{t_1}-1$) and a second reference global representation of the environment at a reference time point immediately before the first time point (represented as $OR_{t_1}-1$). The first reference global representation (represented by $OR_{t_1}$) may be generated by updating a section of the second reference global representation that corresponds to the portion of the environment. In some embodiments, the section of $OR_{t_1}-1$ that corresponds to the portion of the environment may be determined according to a location awareness scene encoding (LASE) process.

For instance, after receiving the environmental data at the first time point (e.g., image data $x_{t_1}$ shown in FIG. 8), the processing device 112 may perform a feature extraction operation on the environmental data to obtain one or more feature vectors representing data associated with the environment. For instance, the feature extraction operation may be performed using a convolution neural network model. In some embodiments, the processing device 112 may further un-project the one or more feature vectors to determine the section of the second static global representation that corresponds to the portion of the environment. The one or more feature vectors may be converted into a three-dimensional (3D) representation (e.g., a 3D tensor representation) of the portion of the environment using an encoder. The 3D representation may be rotated and registered with the second reference global representation. In some embodiments, the section of the second reference global representation may be determined based on the registration between the 3D representation and the second reference global representation. The first reference global representation may be determined by updating the section of the second reference global representation based on the 3D representation of the portion of the environment using the trained reference-update neural network model. In some embodiments, the section of the second reference global representation may be determined based on the location(s) of the at least one of the one or more sensors. For example, when a sensor is located at a fixed position, the location of the sensor may be pre-calibrated. When the sensor is located at a predictable non-fixed position (e.g., on a movable component of which the moving trajectory is known), the location of the sensor may be estimated.

In 706, the processing device 112 (e.g., the static global representation module 430) may generate the first static global representation (e.g., $SR_{t_1}$) by aggregating the first reference global representation (e.g., $OR_{t_1}$) with the second static global representation (e.g., $SR_{t_0}$) using a static-update model. In some embodiments, the static-update model may include one or more data processing algorithms. For instance, the static-update model may direct the processing device 112 to fuse data (e.g., pixel values, feature vectors) of the second static global representation and the first reference global representation according to a weighted averaging algorithm. In some embodiments, the static-update model may be a trained machine learning model. For example, the static-update model may be an RNN model, such as an LSTM model, a GRU model, a CTRNN model, or the like, or any combination thereof. In some embodiments, dynamic information associated with the environment at the first time point $t_1$ may be suppressed after aggregation of the first reference global representation with the second static global representation. Thus, the first static global representation may focus on static information associated with one or more static elements in the environment.

It should be noted that the above description is merely provided for the purposes of illustration, and not intended to limit the scope of the present disclosure. For persons having ordinary skill in the art, multiple variations and modifications may be made under the teachings of the present disclosure. However, those variations and modifications do not depart from the scope of the present disclosure.

Figure 9:
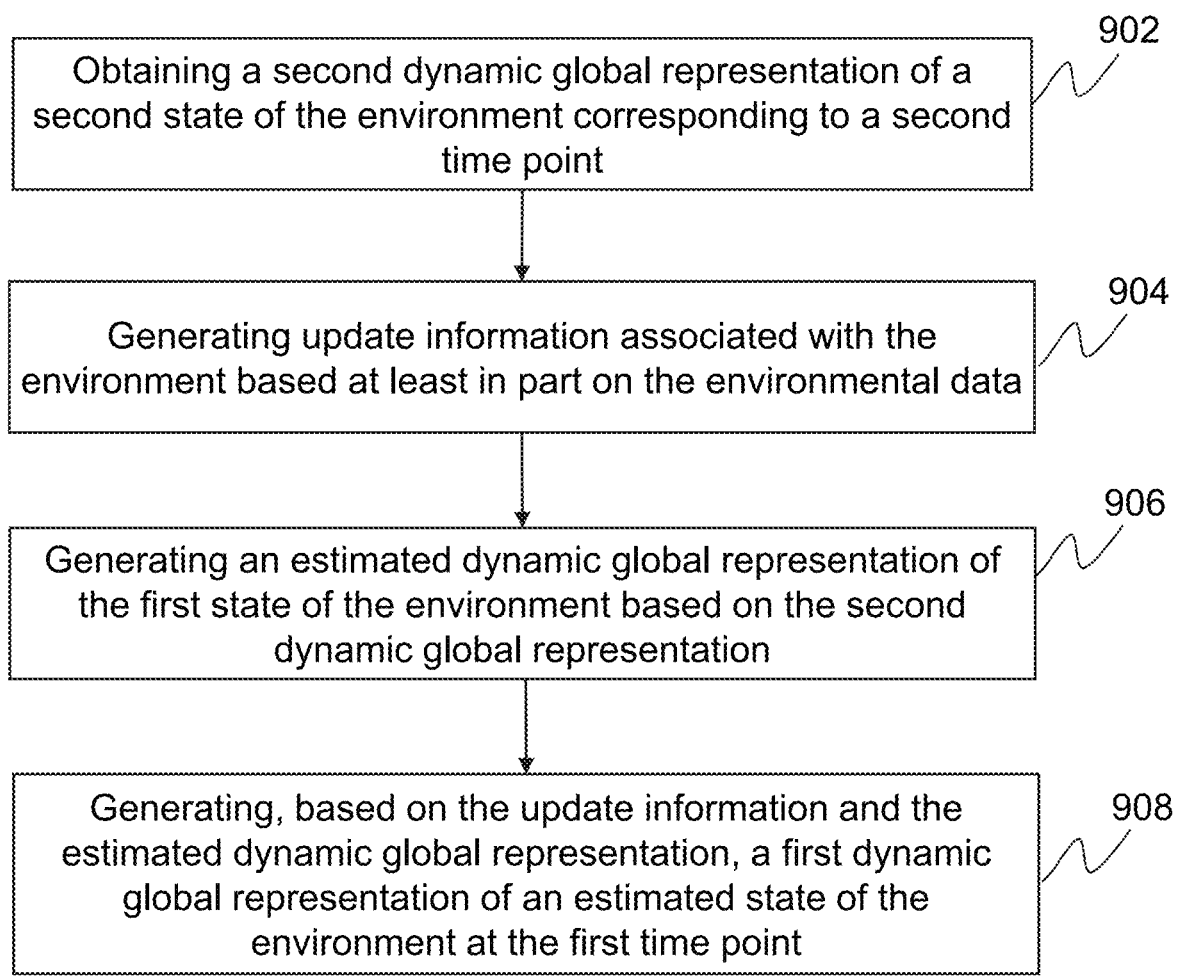
FIG. 9 is a flowchart of an exemplary process for generating a first dynamic global representation of the environment according to some embodiments of the present disclosure.
Figure 10:
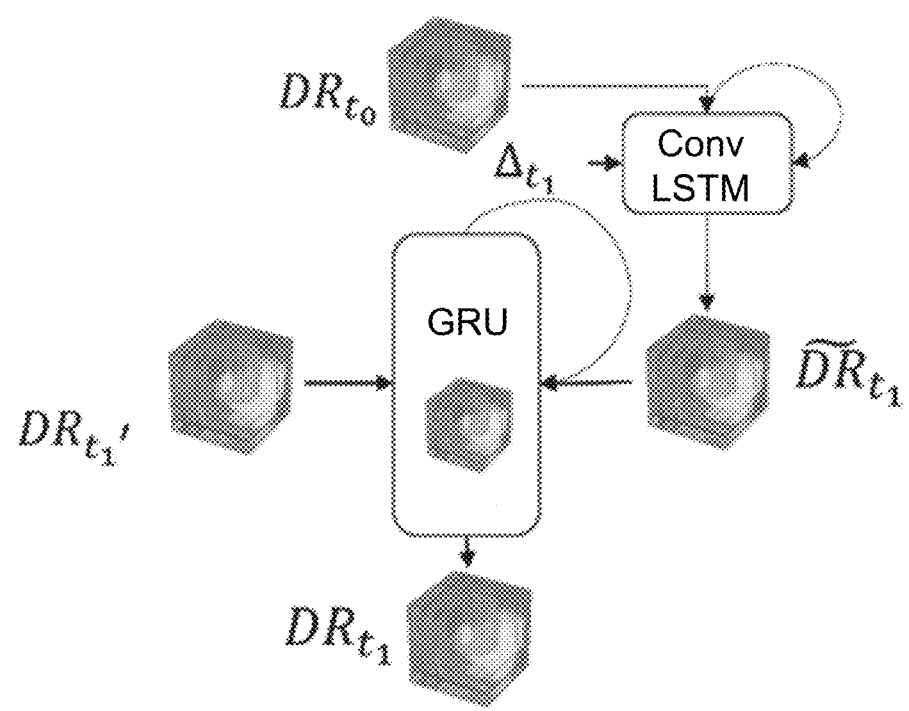
FIG. 10 is a schematic diagram illustrating an exemplary process for generating the first dynamic global representation of the environment according to some embodiments of the present disclosure.

FIG. 9 is a flowchart of an exemplary process for generating a first dynamic global representation of the environment according to some embodiments of the present disclosure. FIG. 10 is a schematic diagram illustrating an exemplary process for generating the first dynamic global representation of the environment according to some embodiments of the present disclosure. In some embodiments, the process 900 may be executed by the system 100. For example, the process 900 may be implemented as a set of instructions (e.g., an application) stored in the storage (e.g., ROM 230 or RAM 240 of the computing device 200). The processing device 112, the modules in FIG. 4, and/or the units in FIG. 5 may execute the set of instructions. When the set of instructions is performed, the process 900 may be executed. The operations of the illustrated process 900 presented below are intended to be illustrative. In some embodiments, the process 900 may be accomplished with one or more additional operations not described, and/or without one or more of the operations discussed. Additionally, the order in which the operations of the process 900 as illustrated in FIG. 9 and described below is not intended to be limiting.

In 902, the processing device 112 (e.g., the obtaining module 410) may obtain a second dynamic global representation of a second state of the environment corresponding to the second time point. For example, the second time point may be earlier than the first time point. In some embodiments, the dynamic global representation of the environment may be updated over time using a dynamic-update model to obtain dynamic global representations of the environment at different time points. In some embodiments, the processing device 112 may update the dynamic global representation if the update condition (e.g., similar to the update condition for updating the static global representation as described in operation 702 of FIG. 7) is satisfied. For example, the update condition may include that one or more sets of data associated with the environment have been received from a preset count of sensors since the second time point. Additionally or alternatively, the update condition may include that one or more sets of data associated with the environment corresponding to a preset count of first reference time points have been received since the second time point. Each of the first reference time points is between the second time point and the first time point. The update condition may be used to control the frequency of updating the dynamic global representation model, which may decease or avoid noise due to excessive update.

For example, as shown in FIG. 10, the second time point may be represented as to, and the dynamic global representation of the environment corresponding to the second time point (also referred to as the "second dynamic global representation") may be represented as $DR_{t_0}$. For illustration purposes, the preset count of first reference time points may be two. Environmental data corresponding to two reference time points $t_1-2$ and $t_1-1$ are received. The environmental data may be received from at least one of one or more sensors as described in operation 602. In some embodiments, the one or more sensors may include a plurality of sensors. In some embodiments, at least two of the plurality of sensors may be configured to acquire data associated with different portions of the environment. In some embodiments, the portion of the environment detected by each of the plurality of sensors may overlap the portion of the environment detected by another one of the plurality of sensors. In some embodiments, the portion of the environment detected by at least one sensor may have no overlapping area with the portion of the environment detected by any other sensors of the plurality of sensors. In some embodiments, at least two of the plurality of sensors may be configured to acquire data associated with the environment or a portion thereof at different time intervals.

The second dynamic global representation $DR_{t_0}$ may be determined through one or more updates of an initial dynamic global representation. Details regarding the update of the dynamic global representation may be found elsewhere in the present disclosure, for example, in FIG. 10, operation 906 of FIG. 9, and the description thereof. Merely by way of example, the initial dynamic global representation may be generated based on a set of environmental data received from at least one of the one or more sensors at an initial time point.

In 904, the processing device 112 (e.g., the dynamic global representation module 440 and/or the update information generating unit 510) may generate update information associated with the environment based at least in part on the environmental data. In some embodiments, the processing device 112 may generate the update information by comparing the first reference global representation (e.g., $OR_{t_1}$) of the environment at the first time point with a second reference global representation of the environment at a second reference time point. The second reference time point may be between the first time point and the second time point. For example, the second reference global representation may be $OR_{t_1-1}$, $OR_{t_1-2}$, or $OR_{t_0}$. In some embodiments, the update information may indicate a difference between the status of the one or more moving elements at the second time and the status of the one or more moving elements at the second time. As shown in FIG. 10, the update information may be in the form of a 3D tensor representation $DR_{t_1'}$. As another example, the update information may be represented by one or more feature vectors.

In 906, the processing device 112 (e.g., the dynamic global representation module 440 and/or the dynamic global representation estimating unit 520) may generate an estimated dynamic global representation of the first state of the environment based on the second dynamic global representation. In some embodiments, at least a portion of the one or more moving elements in the environment may move during a time period from the second time point to the first time point. The estimated dynamic global representation may indicate an estimated status of each of one or more moving elements in the environment at the first time point. Thus, when data associated with only a portion of the environment is received, the processing device 112 may update a section of the second dynamic global representation corresponding to the portion of the environment, and update the dynamic representation of the rest portion of the environment through estimation. In some embodiments, the processing device 112 may determine a time difference (e.g., $\Delta t_1$ in FIG. 10) between the second time point and the first time point. The processing device 112 may generate the estimated dynamic global representation (e.g., $\widetilde{DR}_{t_1}$ in FIG. 10) based on the time difference using a dynamic-estimation model. In some embodiments, the dynamic-update model may include one or more data processing algorithms. For instance, the dynamic-update model may direct the processing device 112 to fuse data (e.g., pixel values, feature vectors) of the second dynamic global representation and the update information according to a weighted averaging algorithm. In some embodiments, the dynamic estimation model may be a trained machine learning model (referred to as a trained dynamic estimation model). For instance, the dynamic-estimation model may include one or more convolution layers for generating one or more feature vectors associated with the second dynamic global representation. The dynamic-estimation model may further include one or more LSTM layers for generating one or more estimated feature vectors for the estimated dynamic global representation. The one or more estimated feature vectors may be further converted to the estimated dynamic global representation, for example, by one or more deconvolution layers in the dynamic-estimation model.

In 908, the processing device 112 (e.g., the dynamic global representation module 440 and/or the dynamic global representation generating unit 530) may generate, based on the update information and the estimated dynamic global representation, a first dynamic global representation of an estimated state of the environment at the first time point. In some embodiments, the first dynamic global representation may be generated by aggregating the update information and the estimated dynamic global representation using the dynamic-update model. In some embodiments, the dynamic-update model may include one or more data processing algorithms. For instance, the dynamic-update model may direct the processing device 112 to fuse data (e.g., pixel values, feature vectors) of the second dynamic global representation and the update information according to a weighted averaging algorithm. The dynamic-update model may include an RNN model, such as an LSTM model, a GRU model, a CTRNN model, or the like, or any combination thereof. In some embodiments, the trained dynamic-update neural network model may be obtained from the storage device 120. In some embodiments, the dynamic-update model may be obtained by training a dynamic-update model with training data. For example, the training data may include a plurality of estimated dynamic global representation samples at different time points, a plurality of representation samples for corresponding update information, and one or more labels. The one or more labels may include dynamic global representation samples at different time points. The training data may be examined and/or modified by a user before being used to train the dynamic-update model.

In some embodiments, static information associated with the environment may be ignored. The processing device 112 may estimate a target dynamic state of the environment at a target time point based on the first dynamic global representation using a target dynamic estimation model. The target dynamic state may indicate a status of each of one or more moving elements in the environment at the target time point. For instance, the target dynamic state may include whether a collision is likely to occur between at least two of the one or more moving elements in the environment at the target time point. In some embodiments, since there is no need for further processing on the static information associated with the environment (e.g., generating the static global representation as described in operation 604), the amount of data to be processed in the process of estimating the target dynamic state may be less than the process of estimating the target state of the environment based on the first static global representation and the first dynamic global representation. In some embodiments, the process of estimating the target dynamic state of the environment may be implemented on a mobile device, such as a built-in device of a vehicle (e.g., for a self-driving application). Such a process may focus on moving elements (e.g., moving cars, pedestrians) in the environment, and thus the processing speed may be improved.

In some embodiments, the target dynamic estimation model may be a trained machine learning model (also referred to a trained dynamic estimation model). In some embodiments, the trained target dynamic estimation model may be a neural network model, such as an RNN model. Merely by way of example, the RNN model may include an LSTM model, a GRU model, a CTRNN model, or the like, or any combination thereof.

It should be noted that the above description is merely provided for the purposes of illustration, and not intended to limit the scope of the present disclosure. For persons having ordinary skill in the art, multiple variations and modifications may be made under the teachings of the present disclosure. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer-readable program code embodied thereon.

A computer readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in a combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations thereof, are not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A system for situation awareness, comprising:
    at least one non-transitory storage medium including a set of instructions; and
    at least one processor in communication with the at least one non-transitory storage medium, wherein when executing the set of instructions, the at least one processor is configured to cause the system to perform operations including:
        obtaining, from at least one of one or more sensors, environmental data associated with an environment corresponding to a first time point;
        generating a first static global representation of an environment corresponding to the first time point based at least in part on the environmental data, the first static global representation indicating a first state of one or more static elements in the environment;
        generating a first dynamic global representation of the environment corresponding to the first time point based at least in part on the environmental data, the first dynamic global representation indicating a first state of one or more moving elements in the environment; and
        estimating, based on the first static global representation and the first dynamic global representation, a target state of the environment at a target time point using a target estimation model, wherein
        the target time point is later than the first time point, and the target state of the environment includes whether an abnormal situation in the environment is likely to occur,
        the target estimation model is a trained neural network model, and
        the estimating, based on the first static global representation and the first dynamic global representation, the target state of the environment at the target time point using the target estimation model includes:
            generating a joint global representation of the first state of the environment corresponding to the first time point by fusing the first static global representation and the first dynamic global representation;
            determining, based on the joint global representation, a target probability using the target estimation model, wherein the target probability is a probability that an abnormal situation is likely to occur in the environment at the target time point;
            comparing the target probability with a probability threshold; and
            in response to a determination that the target probability exceeds the probability threshold, estimating that an abnormal situation is likely to occur in the environment at the target time point.

2. The system of claim 1, wherein the generating a first static global representation of an environment corresponding to the first time point based at least in part on the environmental data includes:
    obtaining a second static global representation of a second state of the environment corresponding to a second time point;
    generating a first reference global representation of the first state of the environment corresponding to the first time point, wherein the first reference global representation includes dynamic information associated with the environment at the first time point and static information associated with the environment at the first time point; and
    generating the first static global representation by aggregating the first reference global representation with the second static global representation using a static-update model.

3. The system of claim 2, wherein the environmental data correspond to a portion of the environment, and the generating a first reference global representation includes:
    obtaining a second reference global representation corresponding to a reference time point, wherein the reference time point is between the first time point and the second time point; and
    updating a section of the second reference global representation that corresponds to the portion of the environment.

4. The system of claim 3, wherein the updating a section of the second reference global representation that corresponds to the portion of the environment includes:

performing a feature extraction operation on the environmental data to generate one or more feature vectors; and un-projecting the one or more feature vectors to update the section of the second static global representation that corresponds to the portion of the environment.

5. The system of claim 1, wherein the generating the first dynamic global representation includes:

obtaining a second dynamic global representation of a second state of the environment at a second time point;

generating, based at least in part on the environmental data, update information associated with the environment;

generating, based on the second dynamic global representation, an estimated dynamic global representation of an estimated state of the environment at the first time point; and generating, based on the update information and the estimated dynamic global representation, the first dynamic global representation of a first state of the environment corresponding to the first time point, wherein the first dynamic global representation indicates a first state of one or more moving elements in the environment.

6. The system of claim 5, wherein the generating an estimated dynamic global representation of an estimated state of the environment at the first time point includes:

determining a time difference between the second time point and the first time point; and generating, using a dynamic-estimation model, the estimated dynamic global representation based on the time difference.

7. The system of claim 1, wherein the abnormal situation includes a collision between at least two elements in the environment.

8. The system of claim 1, wherein the target state of the environment includes a target state of an undetected portion of the environment that is undetectable by the one or more sensors.

9. The system of claim 8, wherein the target state of the undetected portion of the environment is estimated based on one or more hidden layers of the target estimation model, and at least a portion of training data for training the target estimation model relates to one or more sample environments that are similar to the environment.

10. The system of claim 1, wherein the one or more sensors include a plurality of sensors at least two of which are configured to acquire data associated with the environment or a portion thereof at different time intervals.

11. The system of claim 1, wherein the one or more sensors include a plurality of sensors at least two of which are configured to acquire data associated with different portions of the environment.

12. The system of claim 1, wherein in response to a determination that an abnormal situation is likely to occur in the environment, the at least one processor is configured to cause the system to perform additional operations including:

causing an alert related to the abnormal situation to be generated.

13. A method for situation awareness implemented on a computing device, the computing device including at least one non-transitory storage medium including a set of instructions for executing the method and at least one processor for executing the set of instructions, the method comprising:

obtaining, from at least one of one or more sensors, environmental data associated with an environment corresponding to a first time point;

generating a first static global representation of an environment corresponding to the first time point based at least in part on the environmental data, the first static global representation indicating a first state of one or more static elements in the environment;

generating a first dynamic global representation of the environment corresponding to the first time point based at least in part on the environmental data, the first dynamic global representation indicating a first state of one or more moving elements in the environment; and estimating, based on the first static global representation and the first dynamic global representation, a target state of the environment at a target time point using a target estimation model, wherein the target time point is later than the first time point, and the target state of the environment includes whether an abnormal situation in the environment is likely to occur, the target estimation model is a trained neural network model, and the estimating, based on the first static global representation and the first dynamic global representation, the target state of the environment at the target time point using a target estimation model includes:

generating a joint global representation of the first state of the environment corresponding to the first time point by fusing the first static global representation and the first dynamic global representation;

determining, based on the joint global representation, a target probability using the target estimation model, wherein the target probability is a probability that an abnormal situation is likely to occur in the environment at the target time point;

comparing the target probability with a probability threshold; and in response to a determination that the target probability exceeds the probability threshold, estimating that an abnormal situation is likely to occur in the environment at the target time point.

14. The method of claim 13, wherein the generating a first static global representation of an environment corresponding to the first time point based at least in part on the environmental data includes:

obtaining a second static global representation of a second state of the environment corresponding to a second time point;

generating a first reference global representation of the first state of the environment corresponding to the first time point, wherein the first reference global representation includes dynamic information associated with the environment at the first time point and static information associated with the environment at the first time point; and generating the first static global representation by aggregating the first reference global representation with the second static global representation using a static-update model.

15. The method of claim 14, wherein the environmental data correspond to a portion of the environment, and the generating a first reference global representation includes:

obtaining a second reference global representation corresponding to a reference time point, wherein the reference time point is between the first time point and the second time point; and updating a section of the second reference global representation that corresponds to the portion of the environment.

16. The method of claim 13, wherein the generating the first dynamic global representation includes:
   obtaining a second dynamic global representation of a second state of the environment at a second time point;
   generating, based at least in part on the environmental data, update information associated with the environment;
   generating, based on the second dynamic global representation, an estimated dynamic global representation of an estimated state of the environment at the first time point; and
   generating, based on the update information and the estimated dynamic global representation, the first dynamic global representation of a first state of the environment corresponding to the first time point, wherein the first dynamic global representation indicates a first state of one or more moving elements in the environment.

17. The method of claim 16, wherein the generating an estimated dynamic global representation of an estimated state of the environment at the first time point includes:
   determining a time difference between the second time point and the first time point; and
   generating, using a dynamic-estimation model, the estimated dynamic global representation based on the time difference.

18. The method of claim 13, wherein the target state of the environment includes a target state of an undetected portion of the environment that is undetectable by the one or more sensors.

19. The method of claim 18, wherein the target state of the undetected portion of the environment is estimated based on one or more hidden layers of the target estimation model, and at least a portion of training data for training the target estimation model relates to one or more sample environments that are similar to the environment.

20. A non-transitory computer readable medium, comprising at least one set of instructions for situation awareness, wherein when executed by at least one processor of a computing device, the at least one set of instructions direct the at least one processor to perform operations including:
   obtaining, from at least one of one or more sensors, environmental data associated with an environment corresponding to a first time point;
   generating a first static global representation of an environment corresponding to the first time point based at least in part on the environmental data, the first static global representation indicating a first state of one or more static elements in the environment;
   generating a first dynamic global representation of the environment corresponding to the first time point based at least in part on the environmental data, the first dynamic global representation indicating a first state of one or more moving elements in the environment; and
   estimating, based on the first static global representation and the first dynamic global representation, a target state of the environment at a target time point using a target estimation model, wherein
   the target time point is later than the first time point, and
   the target state of the environment includes whether an abnormal situation in the environment is likely to occur,
   the target estimation model is a trained neural network model, and
   the estimating, based on the first static global representation and the first dynamic global representation, the target state of the environment at the target time point using the target estimation model includes:
      generating a joint global representation of the first state of the environment corresponding to the first time point by fusing the first static global representation and the first dynamic global representation;
      determining, based on the joint global representation, a target probability using the target estimation model, wherein the target probability is a probability that an abnormal situation is likely to occur in the environment at the target time point;
      comparing the target probability with a probability threshold; and
      in response to a determination that the target probability exceeds the probability threshold, estimating that an abnormal situation is likely to occur in the environment at the target time point.

* * * * *